(12) United States Patent
Taylor et al.

(10) Patent No.: US 6,204,958 B1
(45) Date of Patent: Mar. 20, 2001

(54) OPTICAL AMPLIFIER HAVING A SUBSTANTIALLY FLAT GAIN SPECTRUM

(75) Inventors: Michael G. Taylor, Laurel; Balakrishnan Sridhar, Elkridge, both of MD (US)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 09/169,159

(22) Filed: Oct. 8, 1998

(51) Int. Cl.[7] .............................. G02F 1/39; H01S 3/094
(52) U.S. Cl. ........................ 359/337; 359/130; 359/341
(58) Field of Search .................................. 359/130, 134, 359/161, 337, 341; 385/37

(56) References Cited

U.S. PATENT DOCUMENTS

| | | | |
|---|---|---|---|
| 5,239,607 | * 8/1993 | da Silva et al. | 359/346 |
| 5,504,609 | * 4/1996 | Alexander et al. | 359/176 |
| 5,541,766 | * 7/1996 | Mizrahi et al. | 359/337 |
| 5,572,357 | * 11/1996 | Nakazato et al. | 359/134 |
| 5,608,571 | * 3/1997 | Epworth et al. | 359/341 |
| 5,636,054 | * 6/1997 | Artigaud et al. | 359/341 |
| 5,636,301 | * 6/1997 | O'Sullivan et al. | 385/24 |
| 5,838,487 | * 11/1998 | Nilsson et al. | 359/174 |
| 5,867,306 | * 2/1999 | Isshiki | 359/341 |

FOREIGN PATENT DOCUMENTS

2265751 * 6/1993 (GB).

OTHER PUBLICATIONS

Deberaque et al, Electronics Letters, vol. 3, #25, pp. 2149–2150, Dec. 7, 1995.*
Pan et al.*
J. J. Pan et al., "Broadband Low Noise EDFA With Flat Gain Response In A Hermetically Sealed Package", ECOC'96, pp. 3.273–3.276.

* cited by examiner

*Primary Examiner*—Nelson Moskowitz
(74) *Attorney, Agent, or Firm*—David L. Soltz

(57) ABSTRACT

An optical amplifier is provided in which optical channels, each at a respective wavelength, make two passes through a segment of erbium-doped optical fiber. After the first pass, certain optical wavelengths lying in the high gain spectrum ("the high gain wavelengths") of the erbium-doped optical fiber are amplified more than other optical wavelengths lying in the low gain spectrum ("the low gain wavelengths"). The optical channels are then reflected with a reflective element back to the segment of erbium-doped optical fiber for the second pass. The reflective element selectively attenuates the high gain wavelengths to compensate for the excessive gain of the erbium-doped optical fiber at these wavelengths. As a result, after the second pass, the optical power at the high and low gain wavelengths is substantially the same and gain flattening is achieved. In an alternative embodiment, the low gain wavelengths are selectively amplified by the reflective element and supplied to the erbium-doped optical fiber at a higher power level than the high gain wavelengths. This additional optical power offsets the low amplification at the low gain wavelengths, such that the erbium-doped optical fiber outputs the high and low gain wavelengths at substantially the same optical power levels.

6 Claims, 12 Drawing Sheets

OPTICAL AMPLIFIER HAVING A SUBSTANTIALLY FLAT GAIN SPECTRUM

BACKGROUND OF THE INVENTION

The present invention is directed toward an optical amplifier having a flattened gain curve.

Optical communication systems are a substantial and fast growing constituent of communication networks. Currently, the majority of optical communication systems are configured to carry an optical channel of a single wavelength over one or more optical waveguides. To convey information from plural sources, time-division multiplexing (TDM) is frequently employed. In time-division multiplexing, a particular time slot is assigned to each signal source, the complete signal being constructed from the portions of the signals collected from each time slot. While this is a useful technique for carrying plural information sources on a single channel, its capacity is limited by fiber dispersion and the need to generate high peak power pulses.

While the need for communication services increases, the current capacity of existing waveguiding media is limited. Although capacity may be expanded e.g., by laying more fiber optic cables, the cost of such expansion is prohibitive. Consequently, there exists a need for a cost-effective way to increase the capacity of existing optical waveguides.

Wavelength division multiplexing (WDM) has been explored as an approach for increasing the capacity of existing fiber optic networks. In a WDM system, plural optical signal channels are carried over a single optical fiber with each channel being assigned a particular wavelength. Such systems typically include a plurality of receivers, each detecting a respective channel by effectively filtering out the remaining channels.

Optical channels in a WDM system are frequently transmitted over silica based optical fibers, which typically have relatively low loss at wavelengths within a range of 1525 nm to 1580 nm. WDM optical signal channels at wavelengths within this low loss "window" can be transmitted over distances of approximately 50 km without significant attenuation. For distances beyond 50 km, however, optical amplifiers are required to compensate for optical fiber loss.

Optical amplifiers have been developed which include an optical fiber doped with erbium. The erbiumn-doped fiber is "pumped" with light at a selected wavelength, e.g., 980 nm, to provide amplification or gain at wavelengths within the low loss window of the optical fiber. However, as seen in FIG. 1, erbium doped fiber amplifiers do not uniformly amplify light within the spectral region of 1525 to 1580 nm. For example, an optical channel at a wavelength of 1540 nm will be amplified 4 dB more than an optical channel at a wavelength of 1555 nm. While such a large variation in gain can be tolerated for a system with only one optical amplifier, it cannot be tolerated for a system with plural optical amplifiers or numerous, narrowly-spaced optical channels. In these environments, much of the pump power supplies energy for amplifying light at the high gain wavelengths rather than amplifying the low gain wavelengths. As a result, low gain wavelengths suffer excessive noise accumulation after propagating through several amplifiers. Thus, there is a need for an optical amplifier having flattened or uniform gain across its gain spectrum, i.e., an optical amplifier with a flattened gain curve.

SUMMARY OF THE INVENTION

A optical amplifier is provided having a substantially flattened gain spectrum. The optical amplifier comprises first and second amplifying stages coupled to respective first and second ports of a three-port optical circulator. A plurality of optical channels, each at a respective wavelength, are amplified by the first amplifying stage of the optical amplifier and supplied to the first port of the optical circulator. The plurality of optical channels are circulated to the second port of the optical circulator and fed to the second amplifying stage. The plurality of optical channels are thus further amplified and supplied to a reflective element, which reflects each of the plurality of optical channels back to the second port of the optical circulator. In one embodiment of the present invention, at least one of the reflected plurality of optical channels is attenuated, while in a second embodiment at least one of the reflected plurality of optical channels is amplified. The reflected optical channels propagate back to the second port and are further amplified by the second stage of the optical amplifier. The optical channels are then circulated to the third port of the optical circulator and output from the optical amplifier.

BRIEF DESCRIPTION OF THE DRAWINGS

Advantages of the present invention will be apparent from the following detailed description of the presently preferred embodiments thereof, which description should be considered in conjunction with the accompanying drawings in which.

DETAILED DESCRIPTION

An optical amplifier is provided in which optical channels, each at a respective. wavelength, make two passes through a segment of erbium-doped optical fiber. After the first pass, certain optical wavelengths lying in the high gain spectrum ("the high gain wavelengths") of the erbium-doped optical fiber are amplified more than other optical wavelengths lying in the low gain spectrum ("the low gain wavelengths"). The optical channels are then reflected with a reflective element back to the segment of erbium-doped optical fiber for the second pass. The reflective element selectively attenuates the high gain wavelengths to compensate for the excessive gain of the erbium-doped optical fiber at these wavelengths. As a result, after the second pass, the optical power at the high and low gain wavelengths is substantially the same and gain flattening is achieved. In an alternative embodiment, the low gain wavelengths are selectively amplified by the reflective element and supplied to the erbium-doped optical fiber at a higher power level than the high gain wavelengths. This additional optical power offsets the low amplification at the low gain wavelengths, such that the erbium-doped optical fiber outputs the high and low gain wavelengths at substantially the same optical power levels.

Figure 1:
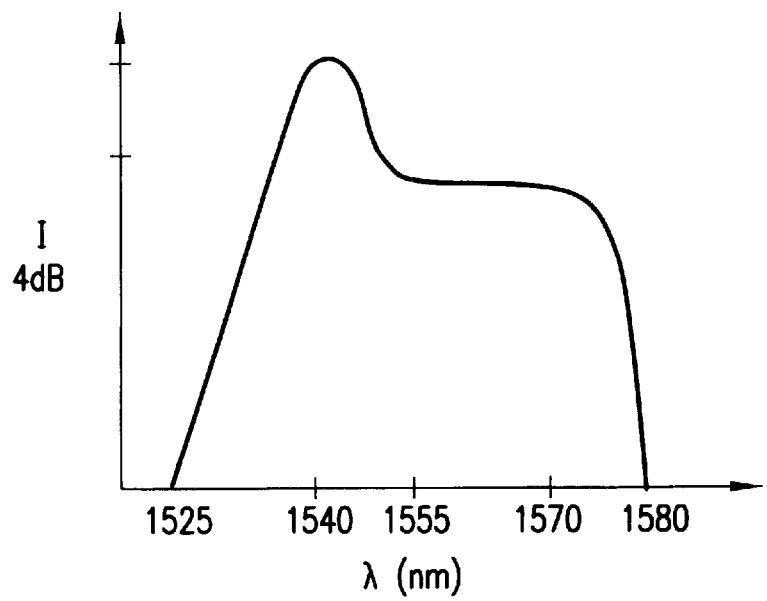
FIG. 1 illustrates a gain spectrum of an erbium doped optical fiber amplifier.

Turning to the drawings in which like reference characters indicate the same or similar elements in each of the several views, FIG. 1 illustrates optical amplifier 200 in accordance with the present invention. Optical amplifier 200 comprises a first stage 210 receiving a plurality of optical channels along input fiber 211. First stage 210 typically includes a section of optical fiber doped with a rare-earth element, such as erbium. Stage 210 is pumped by an optical source such as a laser (not shown) so that stage 210 provides optical amplification or gain to the optical channels.

The amplified optical channels are fed to a first port of optical circulator 220 and exit through second port 220-2. The optical channels are then further amplified in a first pass through second stage 230, which also typically includes optically pumped fiber doped with a rare-earth element such as erbium. As noted above, however, the gain spectrum of an erbium doped optical fiber amplifier is not uniform. In particular, wavelengths within an exemplary range of 1530 to 1540 nm, the high gain wavelengths, are amplified more than those in an exemplary range of 1555 to 1570 nm, the low gain wavelengths. These unequally amplified wavelengths are supplied to reflective element 240.

Reflective element 240 reflects each of the optical channels back to second stage 230 for a second pass through the erbium-doped fiber. Reflective element 240, however, also selectively attenuates the reflected high gain wavelengths such that at the input to second stage 230 the low gain wavelengths have greater optical power than the high gain wavelengths. After passing through stage 230, the excessive amplification at high gain wavelengths raises the optical power of the high gain wavelengths to a level substantially equal to that of the low gain wavelengths and the overall gain associated with optical amplifier 200 is therefore uniform for both high and low gain wavelengths. The reflected optical channels propagate back to second port 220-2 and are output through third port 220-3 of circulator 220.

Figure 3:
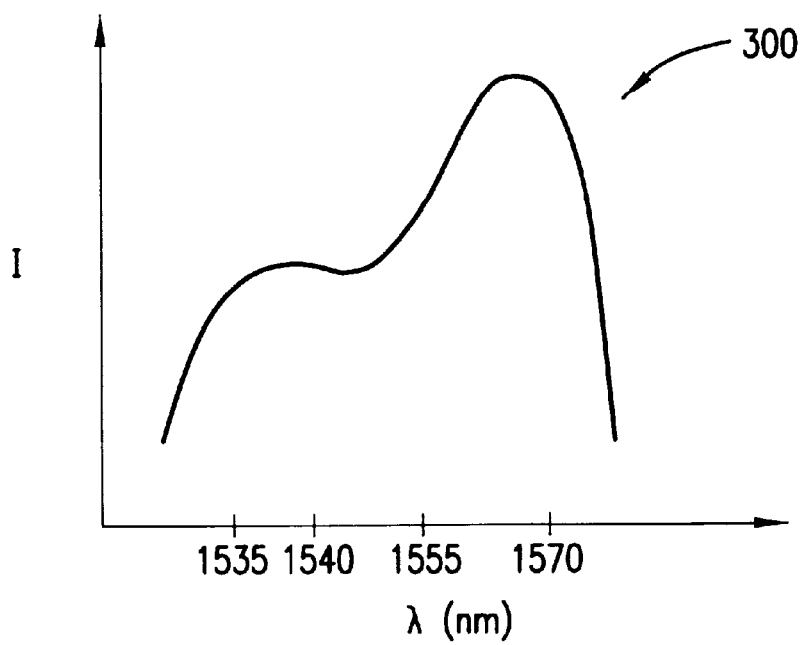
FIG. 3 illustrates an optical power spectrum generated by a reflective element in accordance with the present invention.

FIG. 3 illustrates in greater detail an exemplary optical power spectrum 300 of light reflected by reflective element 240. Typically, optical power spectrum 300 is similar to the inverse of the power spectrum curve of an erbium-doped fiber shown in FIG. 1. Specifically, spectrum 300 has relatively low optical power (I) at wavelengths within the range of 1535 to 1540 nm, but relatively high optical power at wavelengths in the range of 1555 to 1570 nm.

Figure 4:
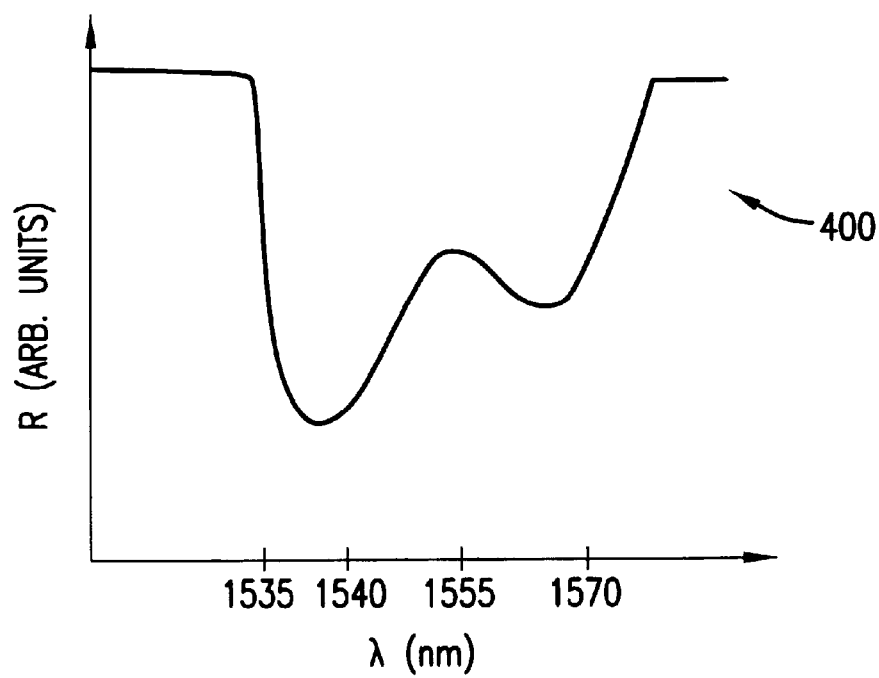
FIG. 4 illustrates a reflectivity characteristic of the reflective element in accordance with the present invention.

FIG. 4 illustrates a reflectivity characteristic 400 of reflective element 240. As seen in FIG. 4, reflective element 240 has lower reflectivity at the high gain wavelengths in the 1535–1540 nm range, but higher reflectivity in the low gain wavelengths in the 1555–1570 nm range. Accordingly, the reflected high gain wavelengths are attenuated significantly more than the low gain wavelengths.

Figure 5:
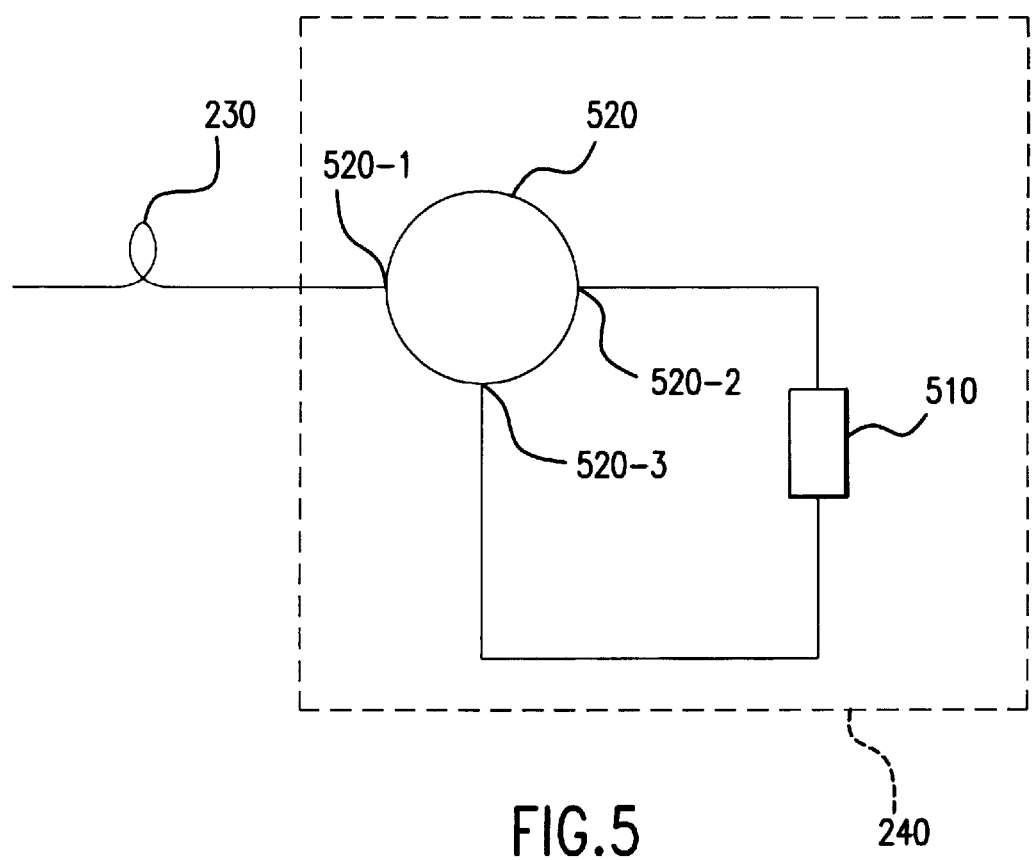
FIG. 5 illustrates an exemplary configuration of the reflective element in accordance with the present invention.

Reflective element 240 can include an in-fiber Bragg grating with a suitable reflectivity characteristic shown in FIG. 4. In-fiber Bragg gratings are described, for example, in Morey et al., Photoinduced Bragg Gratings in Optical Fibers, Optics & Photonics News, February 1994, pp. 9–14. Alternatively, reflective element 240 can include a commercially available reflection mode dielectric filter. Additionally, a transmission mode dielectric filter may be used, such as transmission dielectric filter 510, coupled to an additional three port circulator 520, as shown in FIG. 5. In the configuration shown in FIG. 5, optical channels amplified by second stage 230 are supplied to first port 520-1 of circulator 520. The optical channels are then circulated to second port 520-2 and fed to filter 510. A dielectric filter in reflection mode can also be used instead of transmission mode filter 510.

Figure 6:
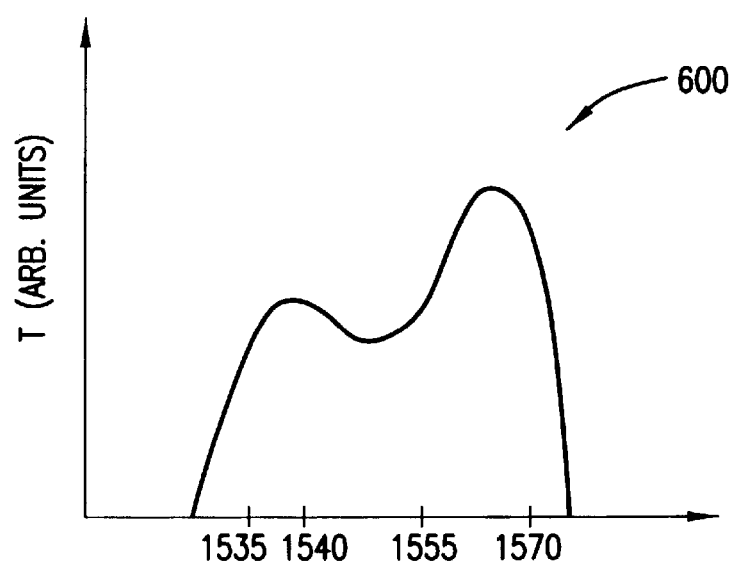
FIG. 6 illustrates a transmission characteristic of a filtering element incorporated into the exemplary configuration of the reflective element in accordance with the present invention.

Filter 510 typically has a transmission characteristic 600 as shown in FIG. 6. Transmission characteristic 600 has relatively low transmissivity at the high gain wavelengths of 1535 nm to 1540 nm, but high transmissivity at the low gain wavelengths of 1555 nm to 1570 nm. After passing through filter 510 the optical channels, are fed to third port 520-3 and circulated back to first port 520-1. The optical channels are then output from reflective element 240 and return to second port 220-2 of circulator 220 via second stage 230.

Figure 7:
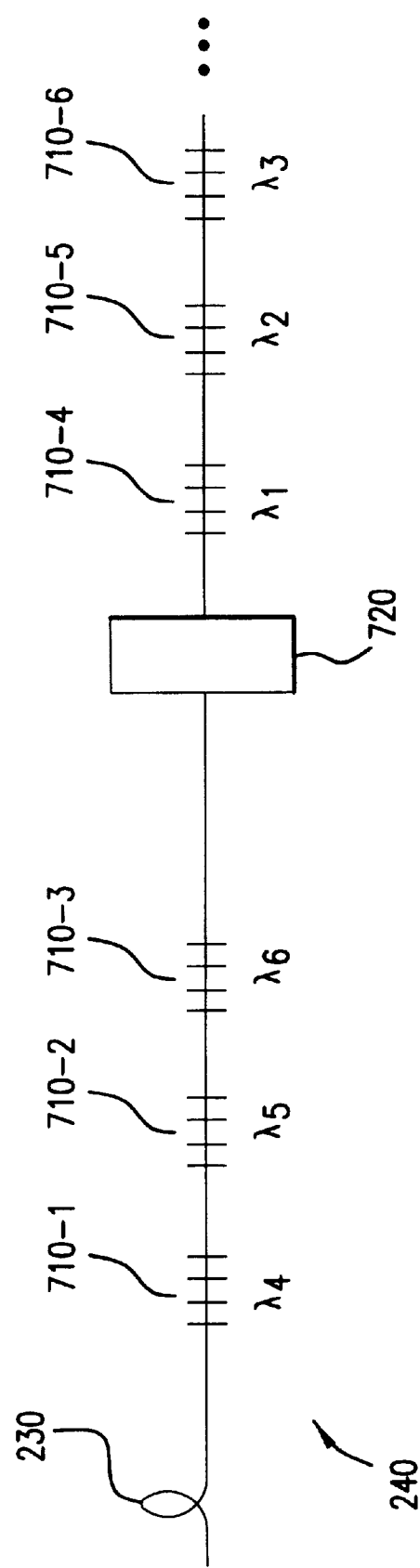
FIG. 7 illustrates an additional embodiment in accordance with the present invention.
Figure 8:
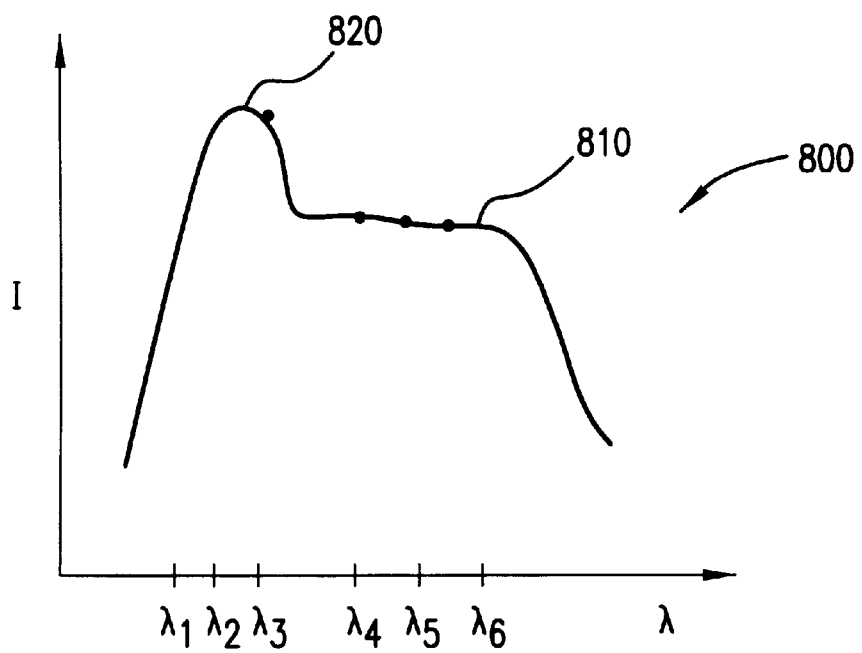
FIG. 8 illustrates an optical power spectrum output from a second stage of an optical amplifier in accordance with the present invention.

FIG. 7 illustrates an additional embodiment of the present invention in which reflective element 240 includes a plurality of in-fiber Bragg gratings 710-1 to 710-6 and an optical attenuator 720. In the exemplary embodiment shown in FIG. 7, six optical channels, each at a respective one of wavelengths $\lambda_1$ to $\lambda_6$, are amplified in a first pass through stage 230 and input to reflective element 240. As seen in FIG. 8, wavelengths $\lambda_4$ to $\lambda_6$ lie in the low gain portion 810 of gain curve 800, while wavelengths $\lambda_1$ to $\lambda_3$ lie in high gain portion 820.

Figure 9:
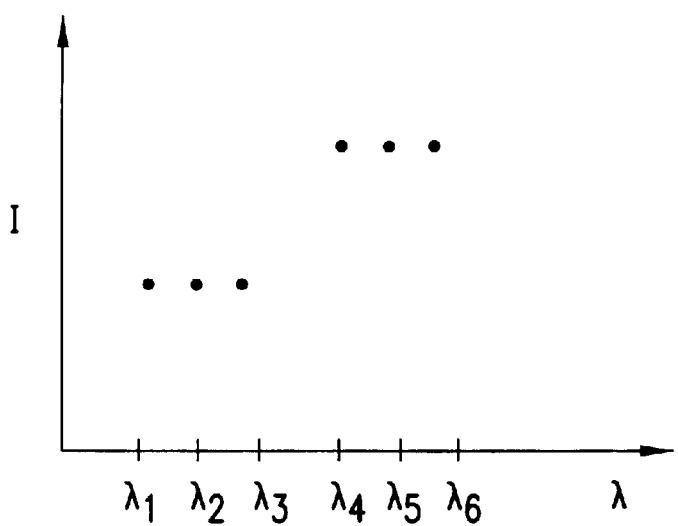
FIG. 9 illustrates an optical power spectrum of wavelengths output from the reflective element shown in FIG. 7.
Figure 10:
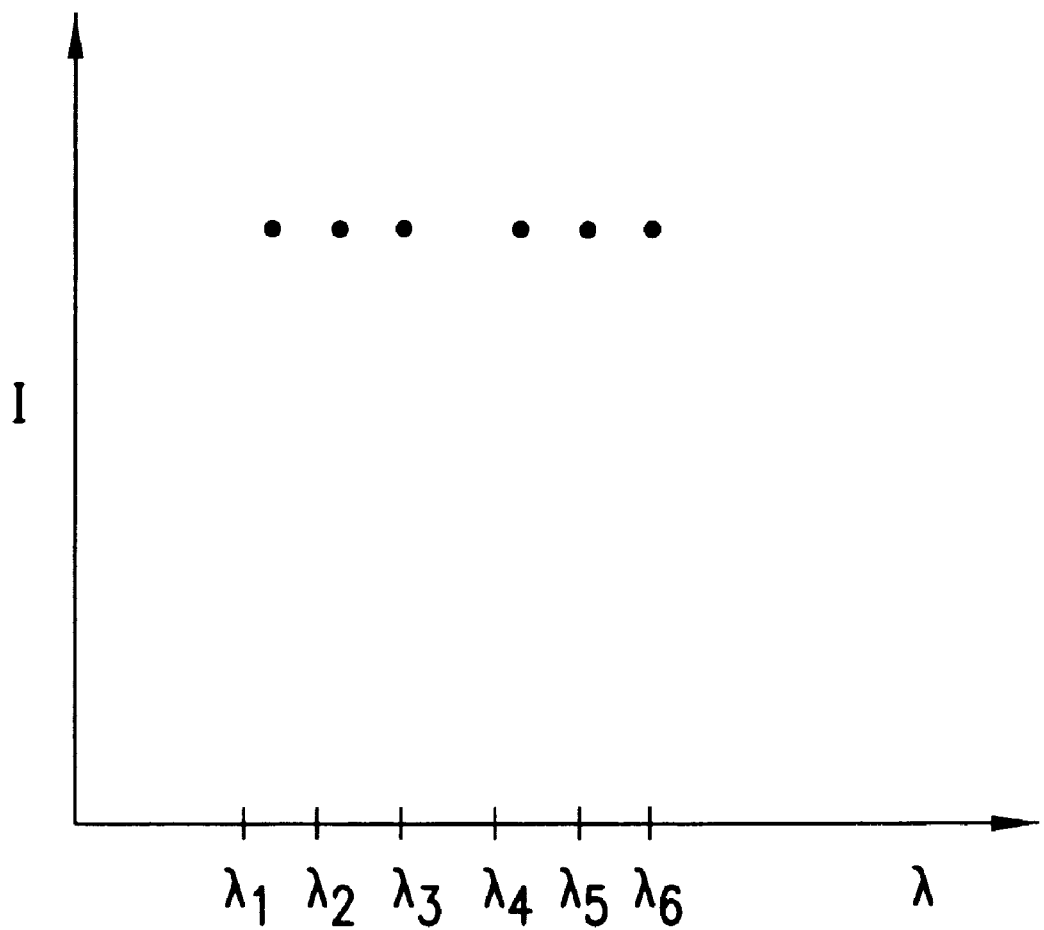
FIG. 10 illustrates an optical power spectrum of wavelengths output from the optical amplifier in accordance with the present invention.

As further shown in FIG. 7, in-fiber Bragg gratings 710-1 to 710-3 reflect wavelengths $\lambda_4$ to $\lambda_6$, respectively, while allowing other wavelengths to pass. Since infiber Bragg grating 710-1 to 710-3 are positioned before attenuator 720, optical channels at wavelengths $\lambda_4$ to $\lambda_6$ in the low gain portion of the gain curve are reflected back to second stage 230 with little attenuation. Optical channels at wavelengths $\lambda_1$ to $\lambda_3$ in the high gain portion of the gain curve, however, are transmitted through gratings 710-1 to 710-3 and are attenuated by optical attenuator 720. Each of wavelengths $\lambda_1$ to $\lambda_3$, in the high gain portion 820 of the gain curve, are reflected back through attenuator 720 by in-fiber Bragg gratings 710-4 to 710-6, respectively. Thus, as shown in FIG. 9, high gain wavelengths $\lambda_1$ to $\lambda_3$ are attenuated twice by attenuator 720 and have lower optical power (I) than low gain wavelengths $\lambda_4$ to $\lambda_6$ upon exiting reflective element 240. During the second pass through second stage 230, however, high gain wavelengths $\lambda_1$ to $\lambda_3$ are amplified more than low gain wavelengths $\lambda_4$ to $\lambda_6$. As a result, the optical power associated with each of wavelengths $\lambda_1$ to $\lambda_6$ is substantially the same after the second pass through second stage 230, as shown in FIG. 10, and the overall gain is equalized.

In an alternative embodiment, gratings 710-4 to 710-6 could be made relatively "weak", i.e., be partially transmissive $\lambda_1$ to $\lambda_3$, and attenuator 720 can be omitted. Further, such gratings can be written with ultraviolet radiation into the erbium-doped fiber of second stage 230.

Figure 11:
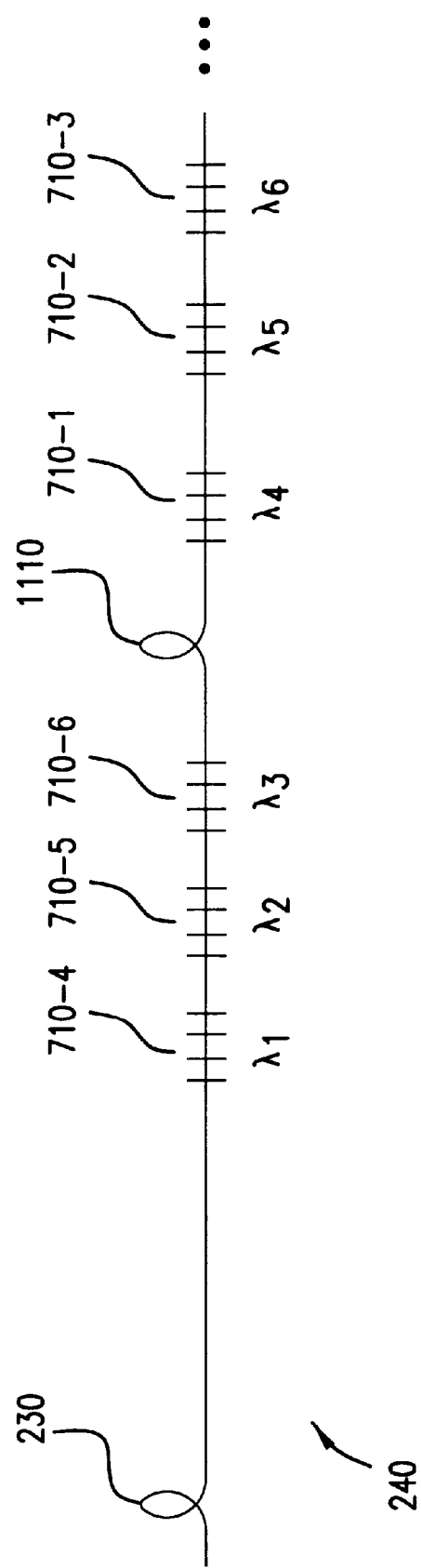
FIG. 11 illustrates a further embodiment in accordance with the present invention.

FIG. 11 illustrates an additional embodiment in which attenuator 720 is replaced by optical amplifier 1110, which includes an erbium-doped optical fiber, for example. In FIG. 11, optical channels amplified during a first pass through second stage 230 are supplied to reflective element 240. High gain wavelengths $\lambda_1$ to $\lambda_6$ are reflected by in-fiber Bragg gratings 710-4, 710-5 and 710-6, respectively. Wavelengths $\lambda_4$ to $\lambda_6$ pass through these gratings and are amplified a first time after transmission through optical amplifier 1110. Wavelengths $\lambda_4$ to $\lambda_6$ are then respectively reflected back through optical amplifier 1110 by in-fiber Bragg gratings 710-1 to 710-3, respectively, and thus amplified a second time. Thus, after reflection by reflective element 240 and prior to reentering second stage 230, low gain wavelengths $\lambda_4$ to $\lambda_6$ have a higher optical power than low gain wavelengths $\lambda_1$ to $\lambda_3$. This difference in optical power is offset by the excessive gain at wavelengths $\lambda_1$ to $\lambda_3$ during the second pass through second stage 230, such that the each of wavelengths $\lambda_1$ to $\lambda_6$ has substantially the same gain upon exiting second stage 230.

In the above embodiment, both the first and second stages of optical amplifier 200 are optically pumped such that a large proportion (e.g., 68% or more) of the erbium atoms, for example, are placed in an excited state, i.e., both stages are pumped to "high inversion". In a further embodiment of the present invention, however, less pump power is supplied to the erbium fiber in second stage 230 so that fewer erbium atoms (e.g., 60% or less) are excited and low inversion is achieved.

Figure 12:
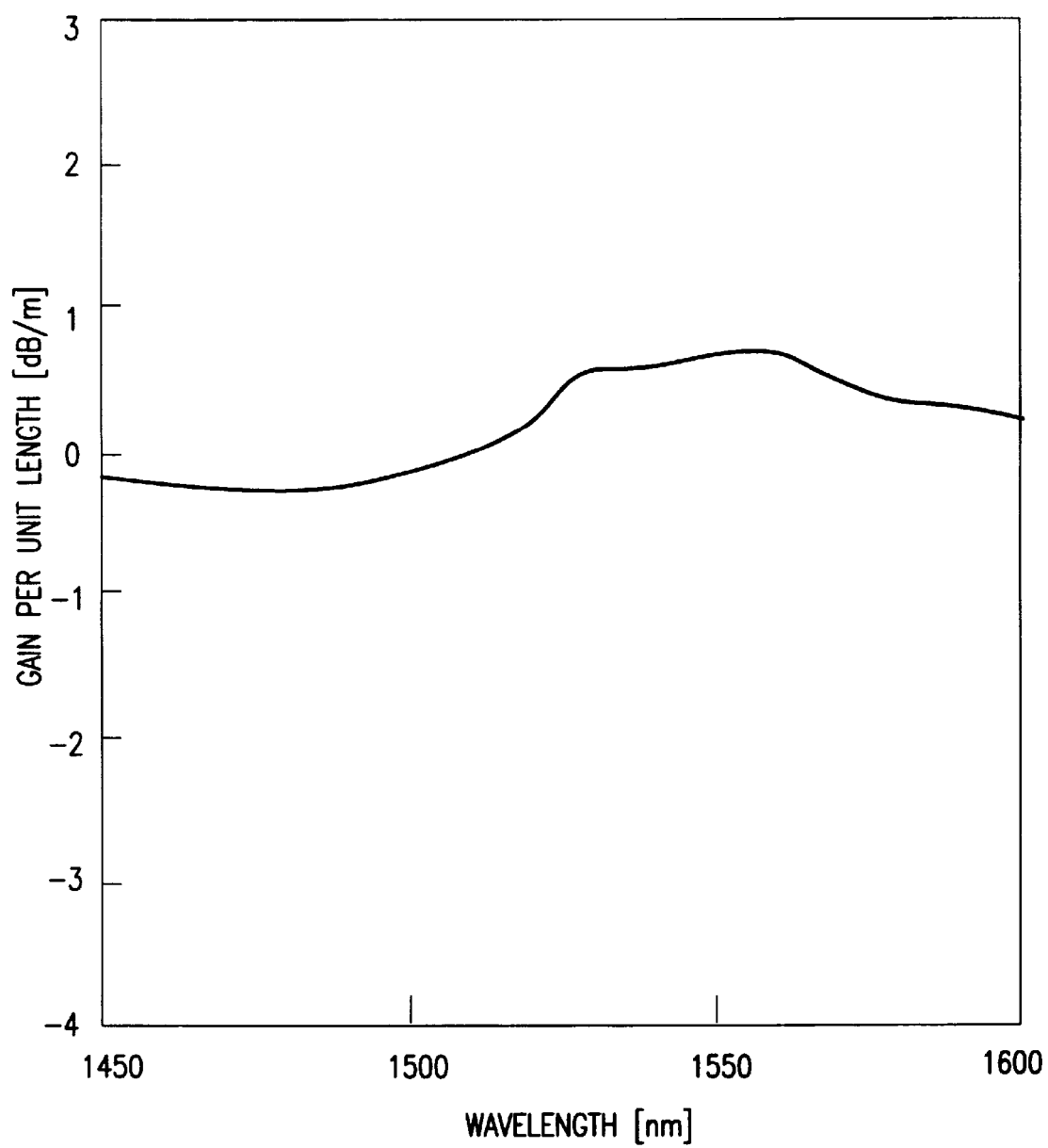
FIG. 12 illustrates a gain spectrum of second stage 230 at lower inversion.
Figure 13:
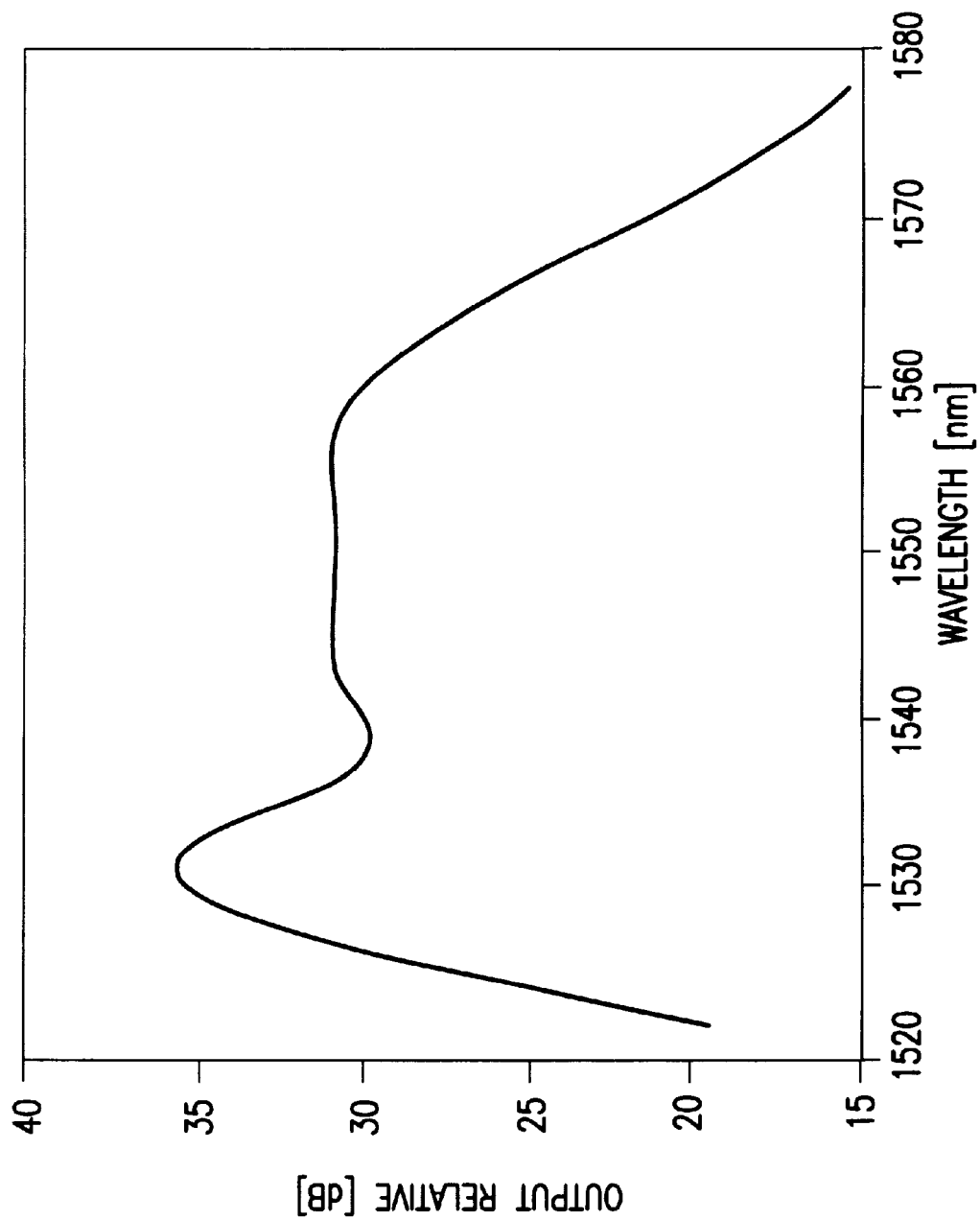
FIG. 13 illustrates a power spectrum of light output from first stage 210 after a first pass through second stage 230 at low inversion.
Figure 14:
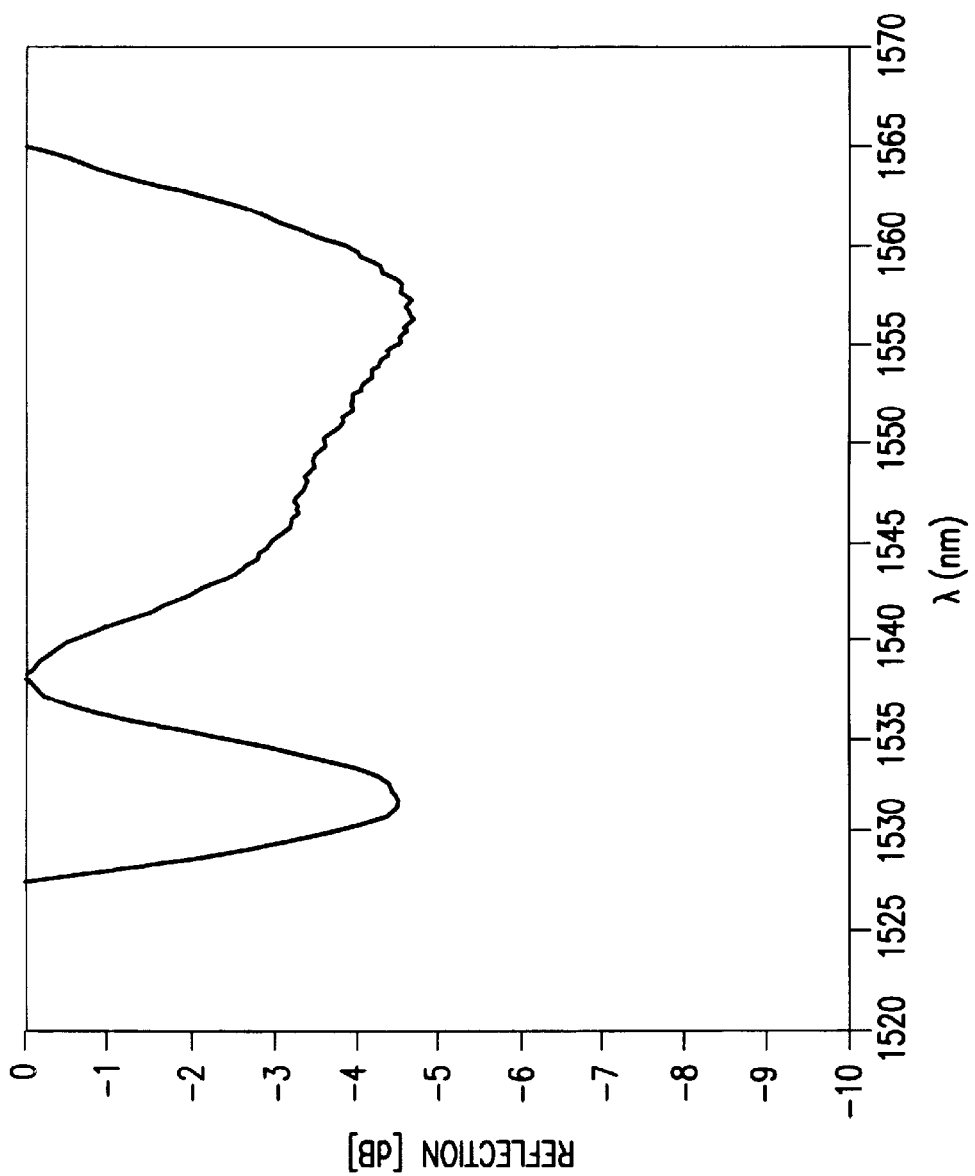
FIG. 14 illustrates a reflectivity characteristic of reflective element 240 in conjunction with second stage 230 in low inversion.
Figure 15:
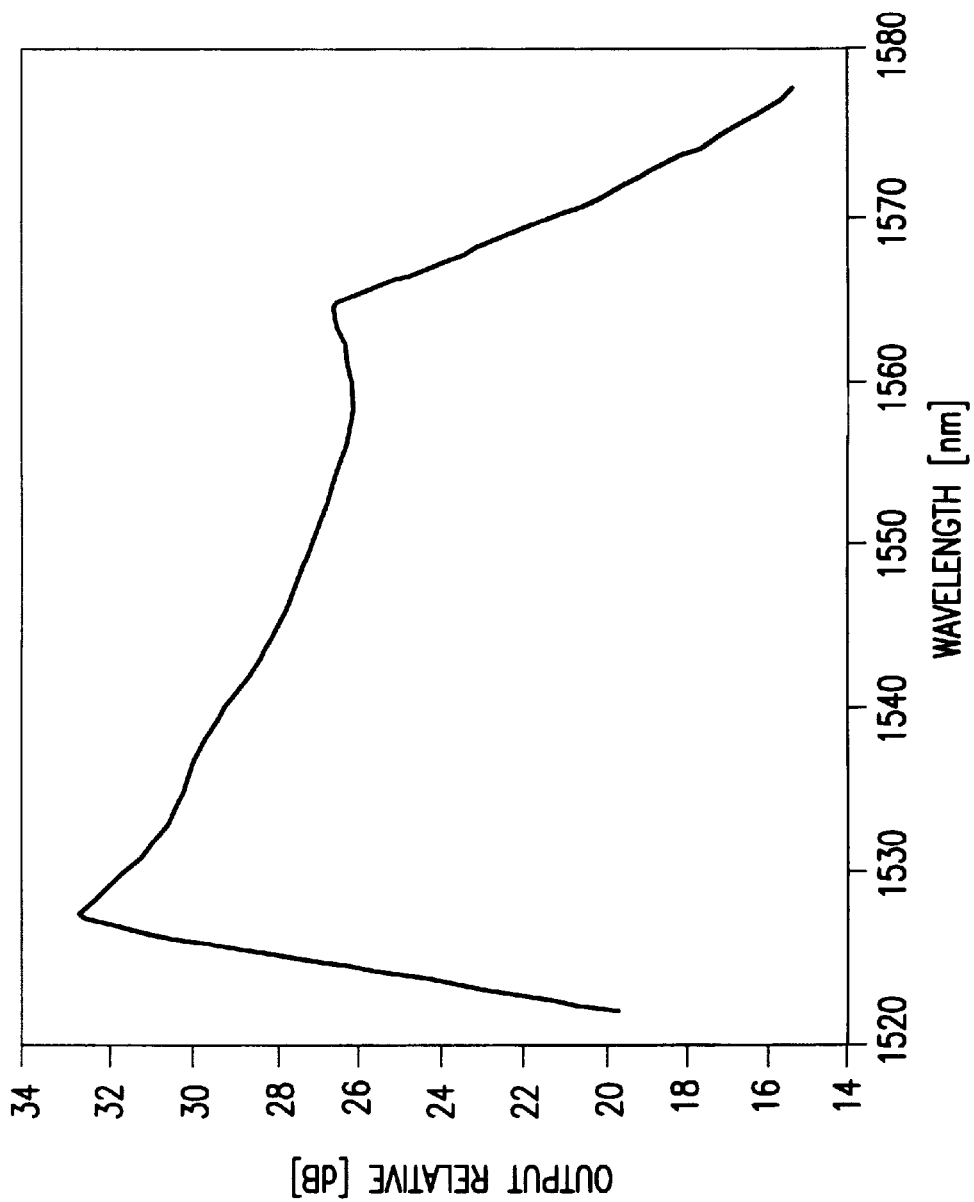
FIG. 15 illustrates the power spectrum of light output from reflective element 240 and input to low inversion second stage 230.
Figure 16:
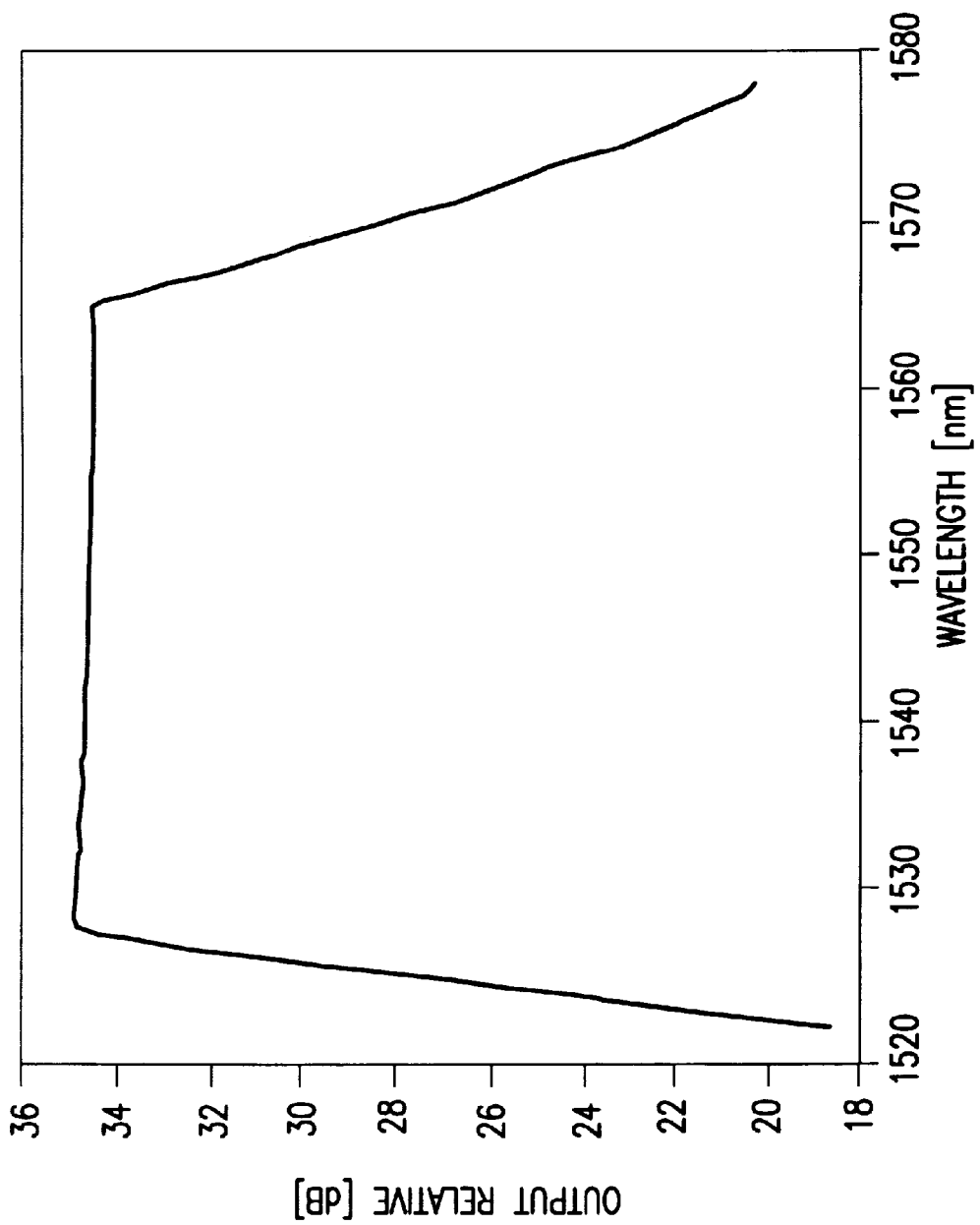
FIG. 16 illustrates the power spectrum output from third circulator port 220-3 for an embodiment of the invention including a low inversion second stage.

FIG. 12 illustrates a gain spectrum of second stage 230 in low inversion. As seen in FIG. 12, wavelengths in the range of 1535 to 1540 nm (previously referred to as the "high gain wavelengths") actually have slightly less gain than wavelengths in the range of 1555 to 1570 mn (the "low gain wavelengths" supra) under low inversion. Light output from first stage 210 has the power spectrum shown in FIG. 13 after a first pass through second stage 230. In order to compensate the power spectrum resulting from a second pass through second stage 230, reflective element 240 typically has a reflectivity characteristic shown in FIG. 14. Accordingly, the power spectrum of light output from reflective element 240 an input to second stage 230 is shown in FIG. 15. After the second pass through second stage 230, the power spectrum output from third circulator port 2203 is substantially flattened over the range of 1530 to 1570 nm, as shown in FIG. 16.

By providing a second stage 230 having low inversion more amplification can be realized over a greater length of erbium-doped fiber, thereby improving efficiency.

Figure 2:
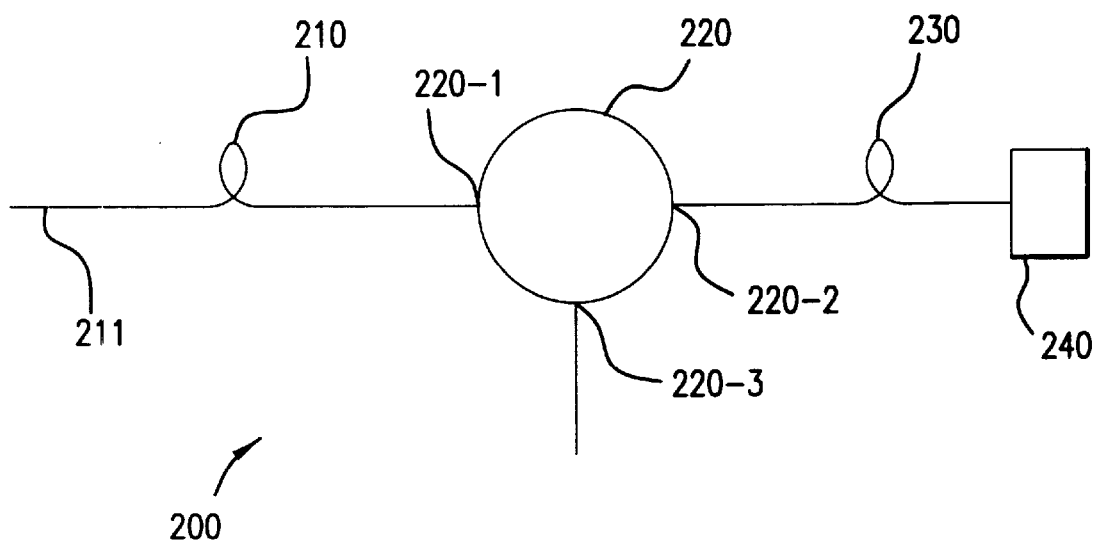
FIG. 2 illustrates an optical amplifier in accordance with an embodiment of the present invention.

Further, an additional amplifying stage can be coupled to third circulator port 220-3 to provide additional gain in optical amplifier 200 shown in FIG. 2. In which case, appropriate adjustments to the reflectivity characteristic can be made provide compensation for unequal gain associated with the additional stage.

While the foregoing invention has been described in terms of the embodiments discussed above, numerous variations are possible. Accordingly, modifications and changes such as those suggested above, but not limited thereto, are considered to be within the scope of the present invention.

What is claimed is:

1. An optical amplifier, comprising:
   a first segment of optically amplifying fiber configured to receive a plurality of optical signals at a first end portion, each of said plurality of optical signals being at a respective one of a plurality of wavelengths, said first segment of doped optical fiber having a second end portion;
   an optical circulator having first, second and third ports, said first port of said optical circulator being coupled to said second end portion of said first segment of doped optical fiber, said optical circulator being coupled to circulate said plurality of optical signal from said first port to said second port;
   a second segment of optically amplifying fiber having a first end portion coupled to said second port of said optical circulator and a second end portion; and
   an optically reflective element coupled to said second end portion of said second segment of optically amplifying fiber, said optically reflective element having a power spectrum that substantially compensates a power spectrum associated with said plurality of optical signals after a single pass through said first segment of optically amplifying fiber and two passes through said second segment of optically amplifying fiber.

2. An optical amplifier in accordance with claim 1, wherein said optically reflective element comprises an in-fiber Bragg grating.

3. An optical amplifier in accordance with claim 1, wherein said optical circulator is a first optical circulator, said optical amplifier further comprising:
   a second optical circulator having a first port coupled to said second port of said first optical circulator, a second port and a third port; and
   a transmission mode dielectric filter having an input coupled to said second port of said second optical circulator and an output coupled to said third port of said second optical circulator.

4. An optical amplifier in accordance with claim 1, wherein said optically reflective element comprises:
   a first plurality of in-fiber Bragg gratings, each configured to reflect a respective one of a first group of said plurality of optical signals;
   an optical attenuator having an input coupled to said first plurality of in-fiber Bragg gratings and an output; and
   a second plurality of in-fiber Bragg gratings, each configured to reflect a respective one of a second group of said plurality of optical signals, said second plurality of in-fiber Bragg gratings being coupled to said output of said optical attenuator.

5. An optical amplifier comprising:
   a first segment of optically amplifying fiber configured to receive a plurality of optical signals at a first end portion, each of said plurality of optical signals being at a respective one of a plurality of wavelengths, said first segment of doped optical fiber having a second end portion;
   an optical circulator having first, second and third ports, said first port of said optical circulator being coupled to said second end portion of said first segment of doped optical fiber, said optical circulator being coupled to circulate said plurality of optical signal from said first port to said second port;

a second segment of optically amplifying fiber having a first end portion coupled to said second port of said optical circulator and a second end portion;

a first plurality of in-fiber Bragg gratings, each configured to reflect a respective one of a first group of said plurality of optical signals;

a third segment of optically amplifying fiber coupled to said first plurality of in-fiber Bragg gratings; and a second plurality of in-fiber Bragg gratings, each configured to reflect a respective one of a second group of said plurality of optical signals, said second plurality of in-fiber Bragg gratings being coupled to said third segment of optically amplifying fiber.

6. A method of amplifying a plurality of optical signals, wherein each of said plurality of optical signals being at a respective one of a plurality of wavelengths, said method comprising the steps of:

non-uniformly amplifying said plurality of optical signals with a first optically amplifying fiber;

supplying said amplified plurality of optical signals to a second optically amplifying fiber;

non-uniformly amplifying said plurality of optical signals with said second optically amplifying fiber;

reflecting said amplified plurality of optical signals from said second optically amplifying fiber back to said second optically amplifying fiber;

selectively attenuating said reflected optical signals with a power spectrum that substantially compensates a power spectrum associated with said plurality of optical signals after a single pass through said first segment of optically amplifying fiber and two passes through said second segment of optically amplifying fiber; and non-uniformly amplifying said reflected and attenuated plurality of optical signals with said second optically amplifying fiber such that said plurality of optical signals having substantially the same power level.

* * * * *